US006526453B2

(12) United States Patent
Golding

(10) Patent No.: US 6,526,453 B2
(45) Date of Patent: *Feb. 25, 2003

(54) METHOD FOR RETRIEVING PREVIOUS INPUT COMMANDS TO AN EXTERNAL PROGRAM FROM AN EDITOR ENVIRONMENT

(75) Inventor: Michael Morris Golding, Palo Alto, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/826,010

(22) Filed: Mar. 27, 1997

(65) Prior Publication Data

US 2002/0062399 A1 May 23, 2002

(51) Int. Cl.[7] .................................................. G06F 9/46
(52) U.S. Cl. ...................................... 709/313; 709/310
(58) Field of Search ................................ 709/300, 310, 709/313, 312, 201, 203; 717/1–11

(56) References Cited

U.S. PATENT DOCUMENTS

| | | | |
|---|---|---|---|
| 4,815,029 A | | 3/1989 | Barker et al. |
| 4,896,290 A | | 1/1990 | Rhodes et al. |
| 5,051,930 A | | 9/1991 | Kuwahara et al. |
| 5,142,618 A | | 8/1992 | Fujiwara et al. |
| 5,301,326 A | | 4/1994 | Linnett et al. |
| 5,446,896 A | * | 8/1995 | Hegarty et al. ................. 707/1 |
| 5,485,370 A | * | 1/1996 | Moss et al. ................. 709/217 |
| 5,537,546 A | * | 7/1996 | Sauter ........................ 709/230 |
| 5,659,741 A | * | 8/1997 | Eberhardt ................ 707/104.1 |
| 5,664,208 A | | 9/1997 | Pavley et al. |
| 5,799,314 A | | 8/1998 | Provino et al. |
| 5,835,769 A | * | 11/1998 | Jervis et al. ................. 717/113 |
| 5,835,919 A | | 11/1998 | Stern et al. |
| 5,922,054 A | | 7/1999 | Bibayan |
| 6,151,609 A | * | 11/2000 | Truong ........................ 707/505 |
| 6,356,954 B2 | * | 3/2002 | Golding ....................... 709/310 |
| 6,405,206 B1 | * | 6/2002 | Kayahara .................... 707/102 |

OTHER PUBLICATIONS

Lu, "A System for Resource–Sharing In a Distributed Environment—RIDE," Bell Laboratories/IEEE, pp. 427–433.
Open VMS and Digital Unix Interoperability Guide May, 1995.*
(FULTON) Fulton, Jennifer, "Netscape Navigator 6 in 1", Jul. 1996.*
(HALL) Hall, Martin et al. "Windows Sockets", Jan. 20, 1993.*
Young, Douglas. "X Window Systems Programming", Jun. 1989.*
Robbins, Judd. "Mastering DOS" 1988, pp. 167–189, 324–356.*
Myers, Edward R. "The APL PLUS System for the Macintosh: An Overview". ACM. 1987.*
Allen, Dan. "The Macintosh Programmer's Workshop". Spring 1988.*

* cited by examiner

Primary Examiner—St. John Courtenay, III
Assistant Examiner—Lewis A. Bullock, Jr.
(74) Attorney, Agent, or Firm—Gates & Cooper LLP

(57) ABSTRACT

The present invention discloses a method, apparatus, and article of manufacture for enabling interaction with one or more external computer programs from within an editor environment. The method involves passing editor input to the external program, wherein the external program evaluates the input, produces corresponding output, and transmits the output back to the editor. When the editor receives the output, it stores the output in a file and displays it on a computer monitor. By using this method, a user can not only interact with the external program from within the editor environment, but can also create an editor file that stores a listing of the input and output provided to the external program.

24 Claims, 11 Drawing Sheets

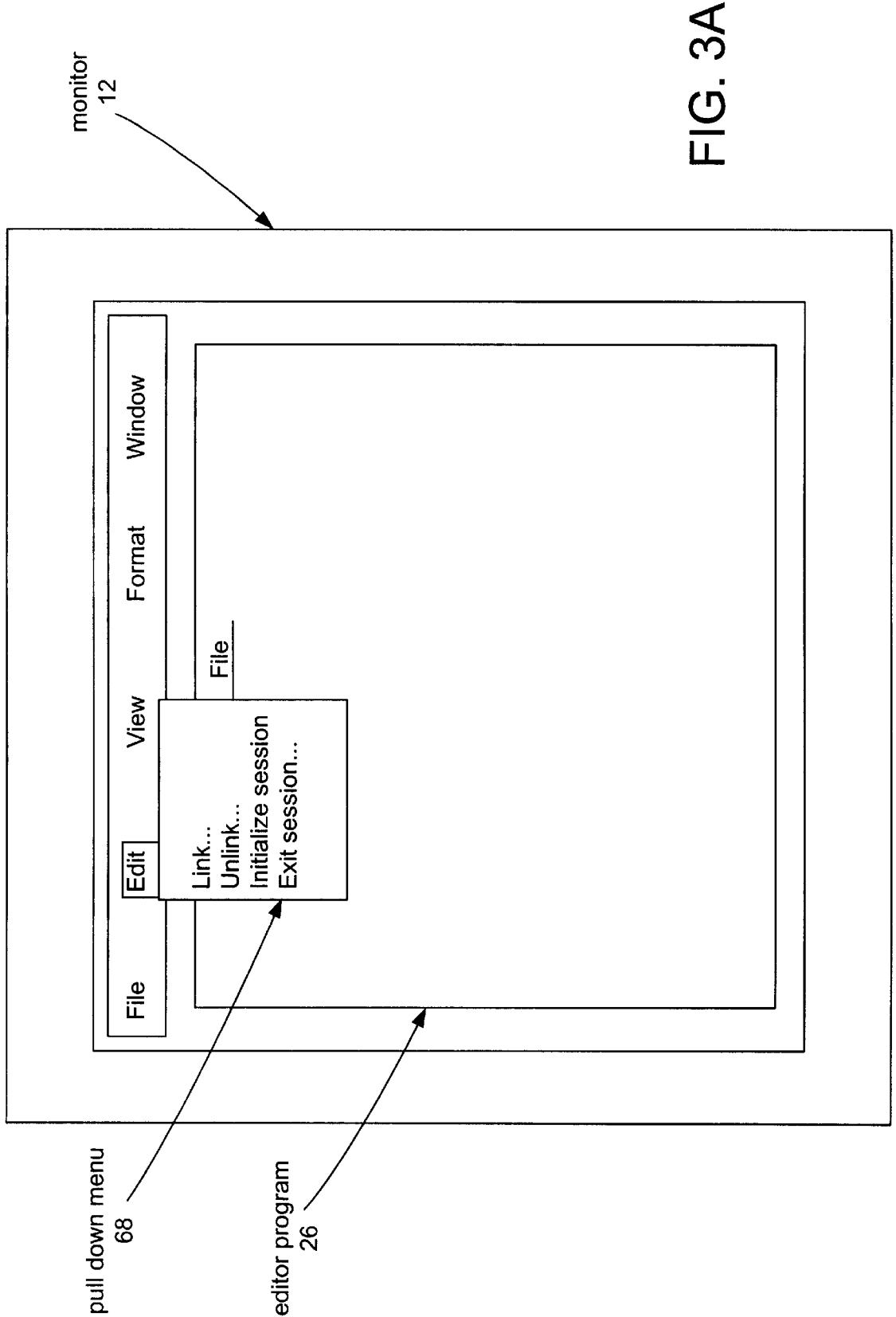

METHOD FOR RETRIEVING PREVIOUS INPUT COMMANDS TO AN EXTERNAL PROGRAM FROM AN EDITOR ENVIRONMENT

CROSS-REFERENCE TO RELATED APPLICATIONS

This application is related to co-pending and commonly assigned patent application Ser. No. 08/825,200, filed on Mar. 27, 1997, by Michael Golding, and entitled "A METHOD FOR ENABLING INTERACTION WITH EXTERNAL COMPUTER PROGRAMS FROM AN EDITOR ENVIRONMENT," now U.S. Pat. No. 6,356,954, issued on Mar. 12, 2002, which application is incorporated by reference herein.

BACKGROUND OF THE INVENTION

1. Field of the Invention

The present invention generally relates to command interpreters for computer systems, and in particular to a method for retrieving previous input commands to an external program from an editor environment.

2. Description of Related Art

Most editor programs provide a variety of useful functions for computer users. These functions may include the ability to organize, store, retrieve, and print information. However, the scope of functions available to the computer user within the editor are limited.

It would be useful, therefore, to make additional functions available within the editor by allowing the user to access one or more programs external to the editor. In the prior art, however, most typical editor input cannot operate as command input to another external program. This limitation prevents users from combining the power of the editor with the extra capabilities of the external program.

Thus, there is a need in the art for a method that allows the computer user to access external programs from the editor environment.

SUMMARY OF THE INVENTION

To overcome the limitations in the prior art described above, the present invention discloses a method, apparatus, and article of manufacture for enabling interaction with one or more external computer programs from within an editor environment. The method involves passing editor input to the external program, wherein the external program evaluates the input, produces either lines of output or zero lines of output, and transmits the output back to the editor. When the editor receives the output, it stores the output in a file and displays it on a computer monitor. By using this method, a user can not only interact with the external program from within the editor environment, but can also create an editor file that stores a listing of the input and output provided to the external program.

BRIEF DESCRIPTION OF THE DRAWINGS

Referring now to the drawings in which like reference numbers represent corresponding parts throughout:

FIG. 3A through FIG. 3I illustrate one possible embodiment of the user interface displayed on the monitor according to the present invention.

DETAILED DESCRIPTION OF THE INVENTION

In the following description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
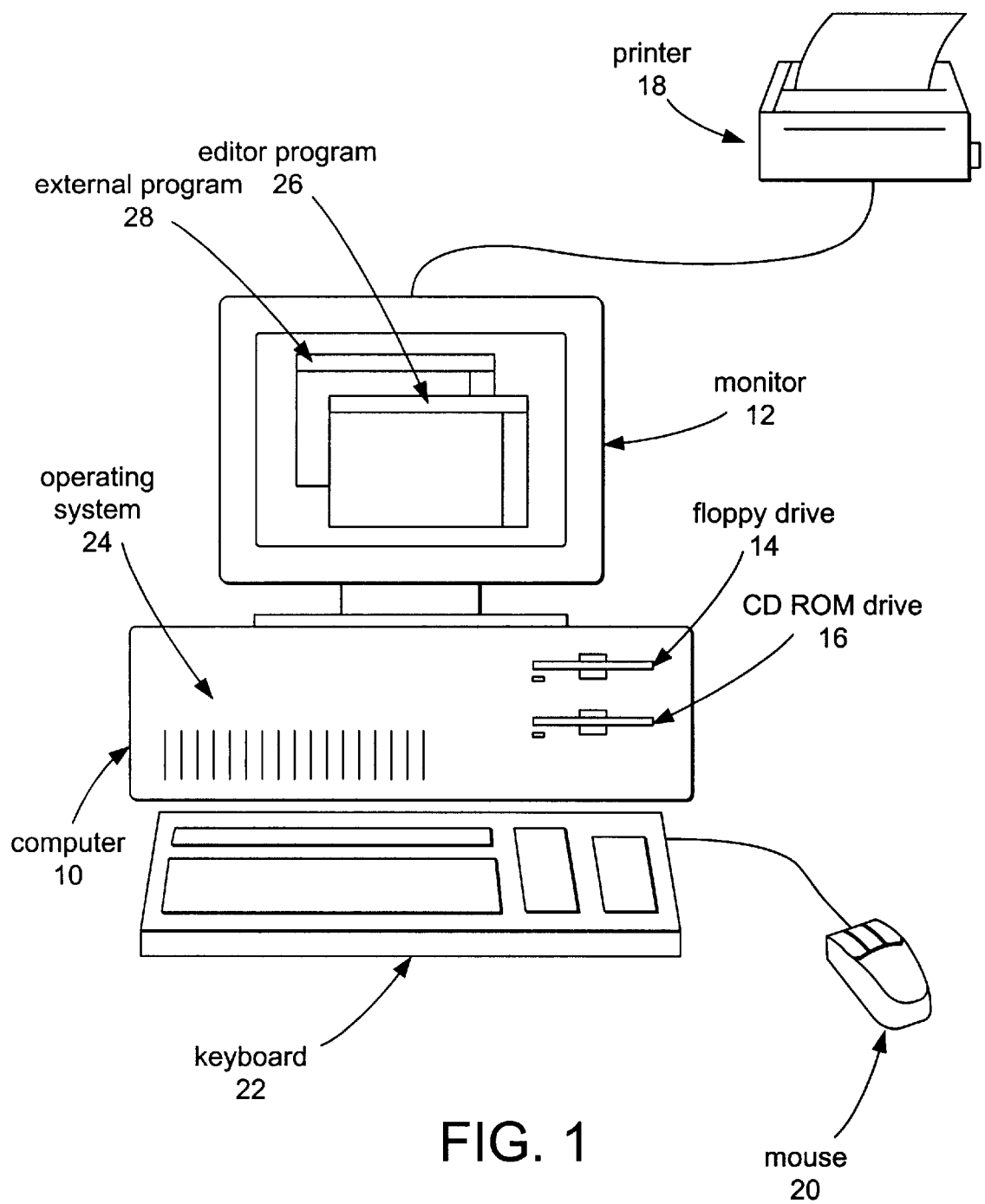
FIG. 1 is a block diagram that illustrates an exemplary hardware environment of the present invention.

FIG. 1 is a block diagram that illustrates an exemplary hardware environment of the present invention. The present invention is typically implemented using a personal computer 10 comprised of a microprocessor, random access memory (RAM), read-only memory (ROM), and other components. It is envisioned that attached to the personal computer 10 may be a monitor 12, hard and/or floppy disk drives 14, CD-ROM drives 16, printer 18, and other peripherals. Also included in the preferred embodiment may be input devices, for example, a mouse pointing device 20 and a keyboard 22.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The personal computer 10 operates under the control of an operating system 24, such as the OS/2™, Windows™, or Macintosh™ operating systems, which is represented in FIG. 1 by the screen display on the monitor 12. The personal computer 10 executes one or more computer programs 26 and 28, which are represented in FIG. 1 by the "windows" displayed on the monitor 12, operating under the control of the operating system 24.

Generally, the operating system 24 and the computer programs 26 and 28 are tangibly embodied in a computer-readable medium, e.g., one or more of the fixed and/or removable data storage devices 14 and 16. Both the operating system 24 and the computer programs 26 and 28 may be loaded from the data storage devices 14 and 16 into the random access memory of the computer 10 for execution by the microprocessor. Both the operating system 24 and the computer programs 26 and 28 comprise instructions which, when read and executed by the microprocessor of the computer 10, causes the computer 10 to perform the steps necessary to execute the steps or elements of the present invention.

In the preferred embodiment, the computer programs 26 and 28 comprise an enhanced editor 26 and one or more programs 28 external to the editor 26 that communicate bidirectionally with the editor 26, although the present invention could be used with other types of computer programs as well. A command within the editor 26 is used to start the user-specified external program 28 as a peer process or dynamically linked routine under the editor 26. The editor 26 then communicates bidirectionally with the external program 28 via, for example, OS/2 pipes or other similar mechanisms built into the operating system 24. The editor 26 passes input lines to the external program 28 using a standard input and output interface or directly through an API. The external program 28 evaluates the input lines (which can comprise both commands and data), performs the functions indicated by the input lines, and generates one or more lines of corresponding output or perhaps generates no output. The external program 28 passes the output lines back to the editor 26 for subsequent storage and display. As a result, the full power and flexibility of the editor 26 environment is retained, yet the editor 26 also becomes a "session manager" for the external program 28.

In the preferred embodiment, a "LINK" command is used to set up the editor 26 environment in a mode for operating according to the present invention. A pull-down menu is marked by the LINK command, wherein the menu is used to initialize a session with a user-specified external program 28 and to provide access to certain commands described in more detail below. The menu is removed when an "UNLINK" command is used to remove the editor 26 from the mode for operating according to the present invention.

Once activated within the editor 26, the present invention redefines the following keys, key combinations, keywords, and/or menu selections during an active session with the external program 28: INIT <pgm≧, ALT-X, ENTER, CTL-ENTER, PAD-ENTER, CTL-PAD-ENTER, CTL-UP, CTL-DOWN.

The user may assign key combinations in addition to the invention commands whose arguments are strings to evaluate. Input and output may thus be directed to the cursor lines or to the bottom of the file. This is similar to using a setup macro for the commands of the editor 26.

The INIT <pgm> keywords initialize a new session by identifying the name "pgm" of the external program 28. This command is also available as "Initialize session" command on the pull-down menu.

Entering "=filename" as input to the editor 26 scans a disk file for the prompted lines and sends them to the external program for evaluation. The input and corresponding result lines are written to the editor 26 file as if the entire file were copied. An appropriate input file might be obtained by saving the file after a session communicating with an external program.

The ALT-X key combination exits from current session and returns to the default editor 26 key definitions. This command is also available as "Exit session" command on the pull-down menu.

The ENTER key transmits the currently selected line or line block to the external program 28, and adds the output lines from the external program 28 immediately following the corresponding selected line(s). This command transmits only input lines, not output lines, in the selected lines. Input lines are lines that have previously been sent as input and thus are preceded with a prompt. As an alternative, these lines can be lines from a previously identified input file. These lines can also include the arguments of a macro. For example, a pre-assigned key combination whose argument string is input lines. This command is also available as "Evaluate in place" on the pull-down menu. If no lines are selected, then the line at the cursor is sent as input. Otherwise all input (prompted) lines in the block are sent and the cursor position is ignored.

The CTL-ENTER key combination transmits the currently selected line or line block to the external program 28, echoes the currently selected line or line block to the bottom of the editor 26 file, and adds output from the external program 28 at the bottom of the editor 26 file. As an alternative, the currently selected lines and the output received from the external program can be directed to a pre-assigned alternate editor window. This command transmits only input lines, not output lines, in the selected lines. This command is also available as "Evaluate at bottom", on the pull-down menu.

Input from a "main" editor 26 session may be sent to the external program 28 and be echoed with corresponding output to another editor 26 window rather than echoing the results to the main window, similar to the process performed by the CTL-ENTER command. There may be also be a user-selectable choice of alternate editor windows.

The PAD-ENTER key combination transmits the currently selected line block to the external program 28, and adds output from the external program 28 immediately following the selected lines. In essence, this command echoes the selected line block interleaved with output from the external program 28 at the original location in the editor 26 file. This command also transmits all of the lines, not just input lines, in the selected line block. As an alternative, these lines can be lines from a previously identified input file. These lines can also include the arguments of a macro. For example, a pre-assigned key combination whose argument string is input lines. If no lines are marked, then the input highlight is removed. This command is also available as "Evaluate block" on the pull-down menu.

The CTL-PAD-ENTER key combination transmits the currently selected line block to the external program 28, echoes the currently selected line block to the bottom of the editor 26 file, and adds output from the external program 28 at the bottom of the editor 26 file. In essence, this command echoes the selected line block interleaved with output from the external program 28 at the bottom of the editor 26 file. As an alternative, the currently selected lines and the output received from the external program can be added to a pre-assigned alternate editor window. This command also transmits all of the lines, not just input lines, in the selected line block. If no lines are marked, then the highlighted input line is reset at or near (above) the cursor. This command is also available as "Set retrieve" on the pull-down menu.

The CTL-UP key combination changes the emphasis (using the reverse-video of the highlight color) to the first highlight line above the current emphasized input line and echoes the line to the bottom of the editor 26 file, In essence, this command moves the input focus or command prompt up one line in the editor 26 file and echoes the line at the input focus to the bottom of the editor 26 file. This command is also available as "Retrieve up" on the pull-down menu.

The CTL-DOWN key combination similarly emphasizes and echoes the next highlighted line to the bottom of the editor 26 file. In essence, this command moves the input focus or command prompt down one line in the editor 26 file and echoes the line at the bottom of the editor 26 file. This command is also available as "Retrieve down" on the pull-down menu.

When performing the above-described functions under the present invention, inputs to and responses from the external program 28 need to be synchronized by the editor 26, so that they can be interleaved in the file being edited by the editor 26 (only when an external program is seen as a separate process). Therefore, the user needs to set either a "delay" or (preferably) an "end-of-response tag" setting. If an external program is run synchronously through a direct API, then the delay and end-of-response tag are not used. The delay specifies a time (in milliseconds) for the editor 26 to wait between writing to the input pipe of the external program 28 and reading from the output pipe of the external program 28.

The end-of-response tag is a string used by the editor 26 to determine when the output pipe of the external program 28 has the last response line for the previous input to the external program 28. When the string is set, the editor 26 reads the output pipe of the external program 28 in a separate thread, waiting for either the total pipe contents to exactly match the tag, or for the final n+2 bytes in the pipe to match the tag preceded by a carriage return and line feed.

If the tag is not seen 1 or 2 seconds after the output pipe of the external program 28 stops filling, the editor 26 then repeatedly prompts the user to ask whether to continue waiting on the read (retry) or stop waiting for output (cancel). If the user cancels, they should then change or remove the tag, and re-enter input (the response from which will include "lost" output from previous input) or stop the current session and then restart the external program 28 with the proper tag. When a tag is set, the delay setting is used only to increase the time between prompts to continue reading.

Figure 2A:
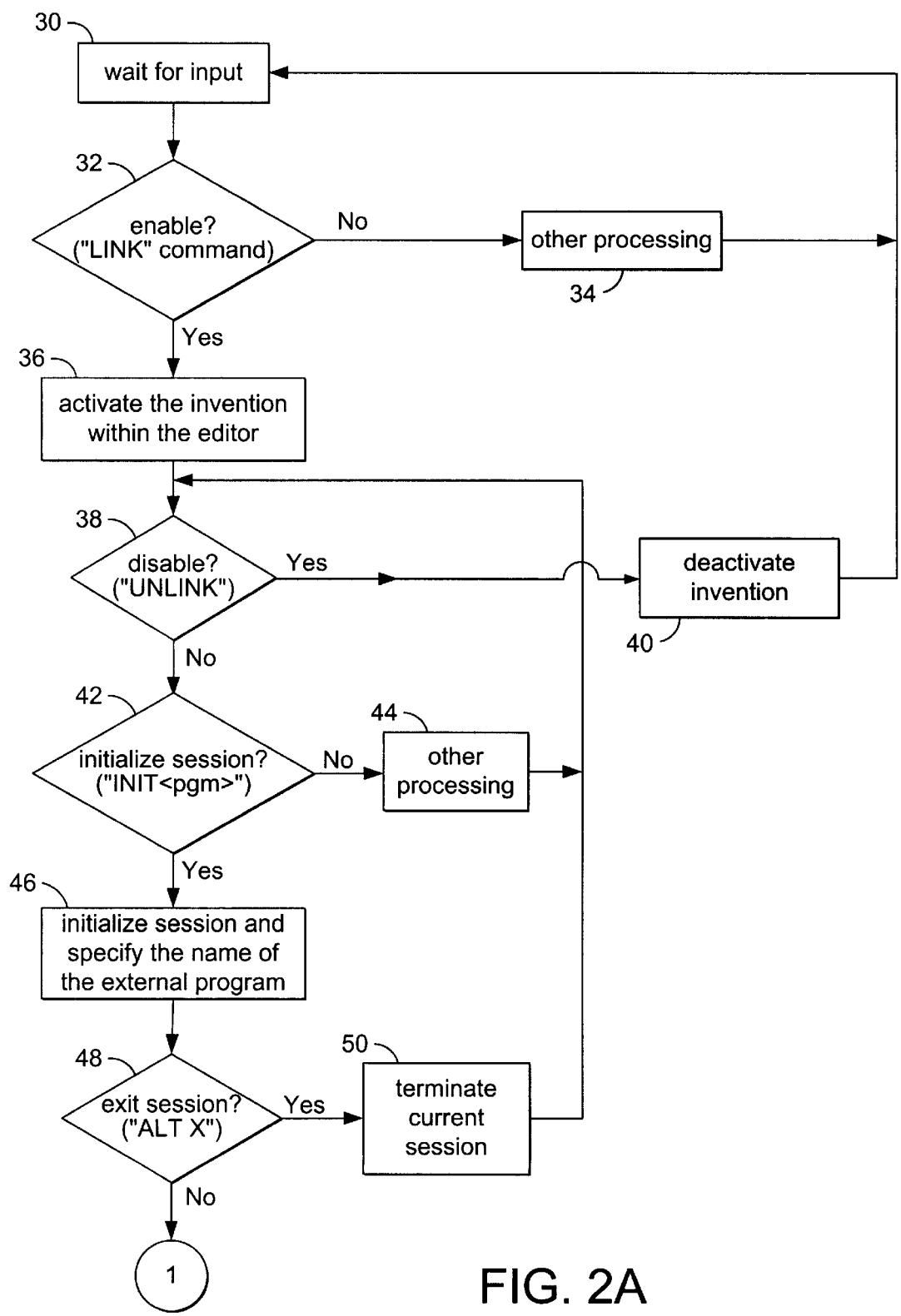
FIGS. 2A–2B is a flowchart showing the steps performed by the computer when a user interacts with an external program.
Figure 2B:
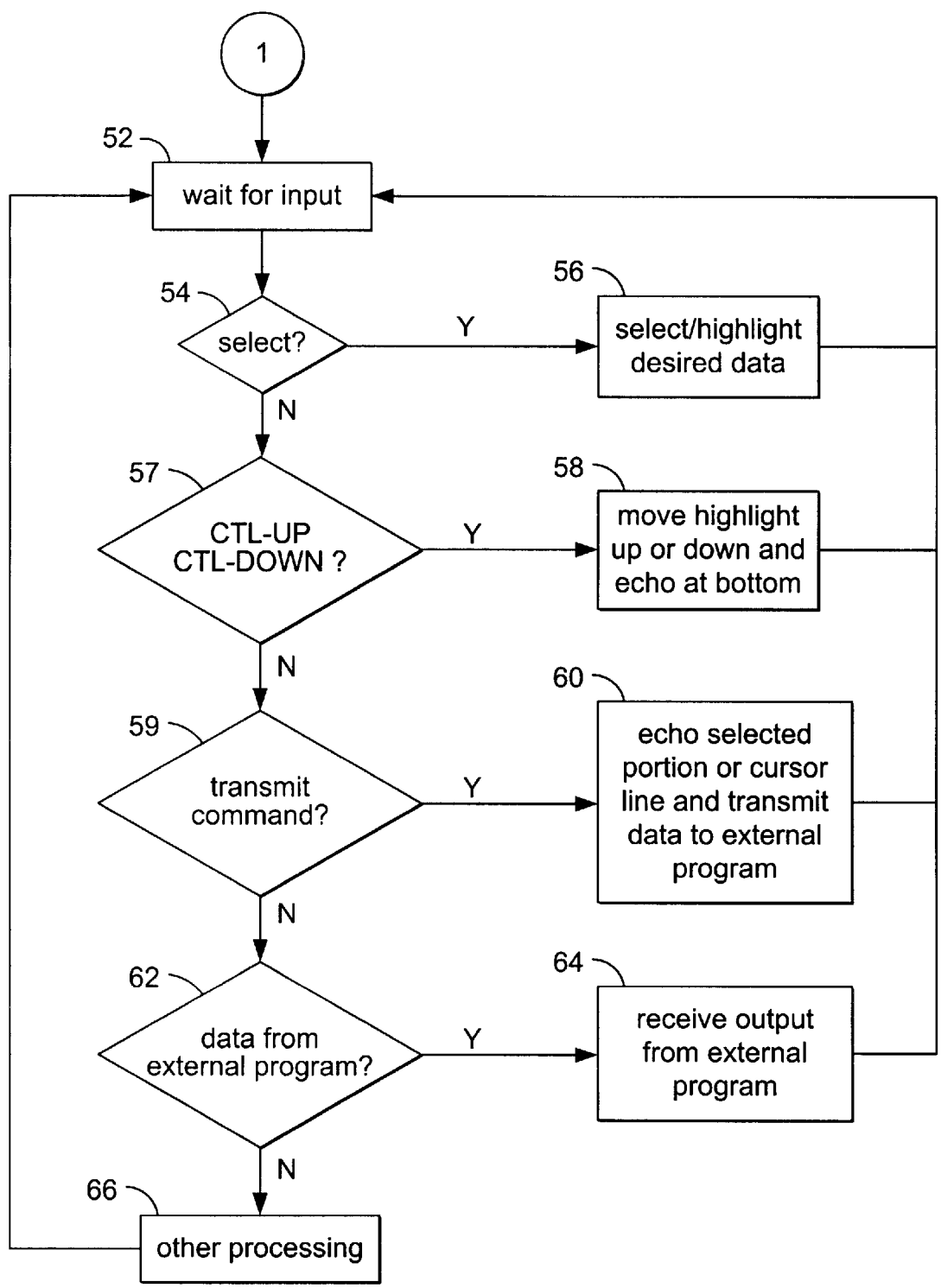

FIGS. 2A–2B is a flowchart illustrating the operation of the computer 10 in accordance with the present invention.

Block 30 represents the computer 10 waiting for input. Block 32 is a decision block that represents the computer 10 determining whether the user has entered a LINK keyword command to enable the invention. If not, control transfers to Block 34.

Block 34 represents the computer 10 handling other processes and transferring control back to Block 30.

Block 36 represents the computer 10 activating the invention within the editor. After activation, control transfers to Block 38.

Block 38 is a decision block that represents the computer 10 determining whether the user has entered an UNLINK keyword command to disable the invention. If so, control transfers to Block 40, which represents the computer deactivating the invention.

Block 42 is a decision block that represents the computer 10 determining whether the user has entered an INIT<pgm> command to begin a new session. If not, control transfers to Block 44, which represents the computer 10 handling other processes.

Block 46 represents computer 10 initializing a session and specifying the name of an external program.

Block 48 is a decision block that represents the computer 10 determining whether the user has entered an ALT-X command to exit a session. If so, control transfers to Block 50, which represents computer 10 terminating the current session.

Block 52 represents the computer 10 waiting for data. Block 54 is a decision block that represents the computer 10 determining whether the user has selected a portion of the data displayed on the monitor 12. If so, control transfers to Block 56, which represents the computer 10 highlighting the desired data.

Block 57 is a decision block that represents the computer 10 determining whether the user has typed in a CTL-UP or CTL-DOWN command to move the input highlight to the previous or next input line 74. If a user does enter a CTL-UP or CTL-DOWN command, control transfers to Block 58, which represents the computer 10 moving the highlighted portion in the editor 26 file and echoing the highlighted portion at the bottom of the screen.

Block 59 is a decision block that represents the computer 10 determining whether the user has typed a command or key combination to transmit the block of lines or cursor line data to a previously defined external program 28. The accelerator keys for transmitting data are ENTER, CTL-ENTER, PAD-ENTER, and CTL-PAD-ENTER. Comparing ENTER to PAD-ENTER, users hit ENTER when they want to transmit only prompted (previously input) lines. Otherwise, to transmit all lines as input, they hit PAD-ENTER. The CTL-UP and CTL-DOWN keys only shift the input focus up or down one input line 74. Regarding the CTL prefix, CTL instructs the computer 10 to echo the currently selected portion to the bottom of the editor 26 file. The CTL prefix also undoes the last set of changes to the original input lines. If a user does a transmit, control transfers to Block 60, which represents the computer 10 echoing the selected portion in the editor 26 file (if so indicated according to the type of transmit command entered) and performing the transmit function.

Block 62 is a decision block that represents the computer 10 determining whether the external program produced output. If so, control transfers to Block 64, which represents the computer 10 receiving that output into the editor 26 file.

Block 66 represents the computer handling other processes and transferring control back to Block 52.

FIG. 3A illustrates a pull down menu 68, wherein the menu is used (a) to set up the editor 26 environment using a "LINK" command; (b) to remove the pull down menu using the "UNLINK" command; (c) to initialize a new session using the "Initialize session" command; and (d) to exit a session using the "Exit session" command.

Figure 3B:
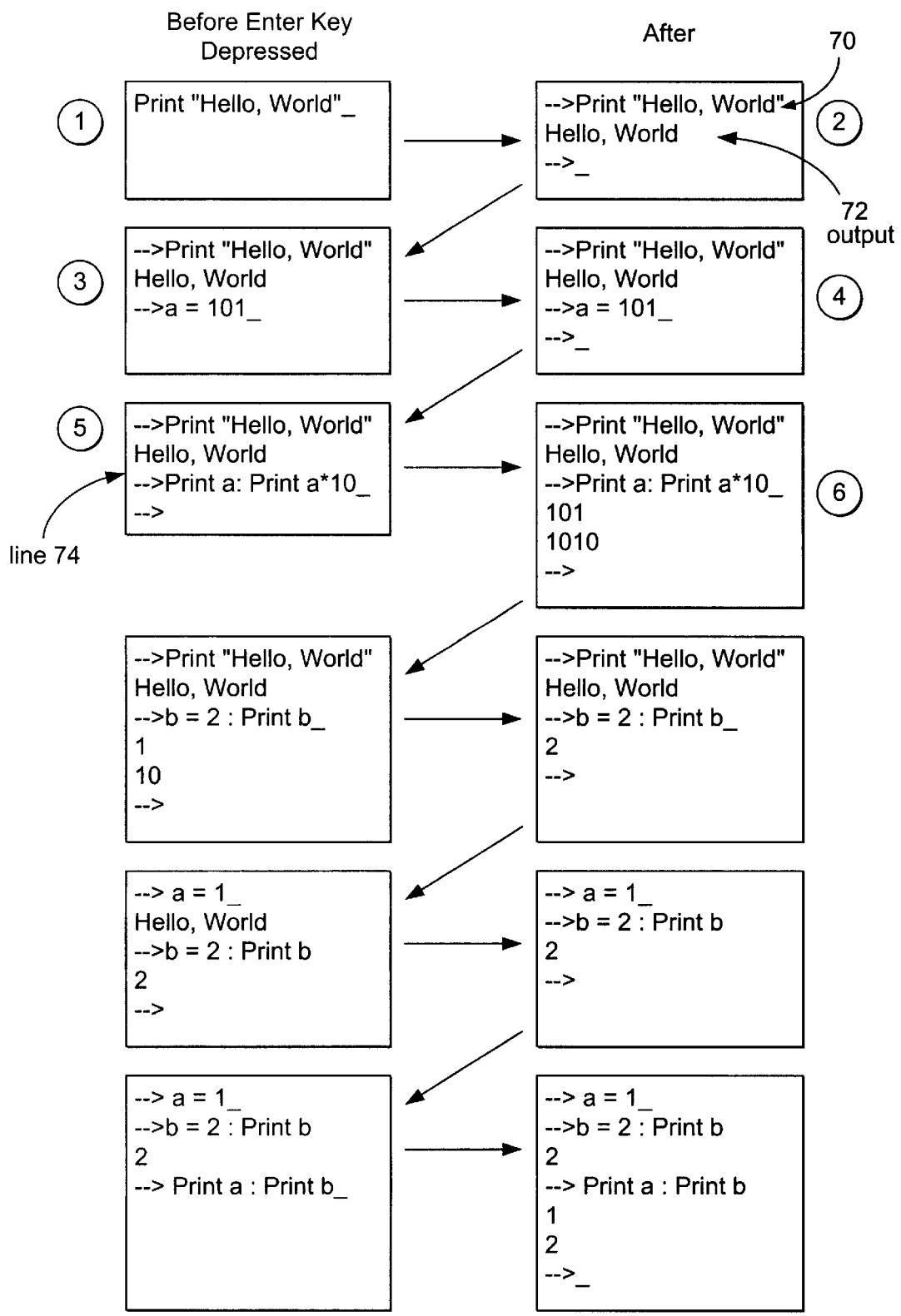

FIG. 3B represents the computer 10 responding to a "ENTER" keyword command where there is no marked block of data. The "ENTER" key evaluates the cursor line to the external program 28 and adds the output 72 from the external program 28 immediately following the corresponding selected input lines. The highlighting is shown as bold text in FIG. 3B. The cursor position is shown as an underscore, "_". A prompt is added to the line if it does not already have one. This command transmits only input line 74. Screen (5) shows an input line 74 that has been changed from a =101" to "Print a: Print a*10"; screen (6) shows that the external program 28 then responds to this changed line. If the cursor is at the bottom of the input screen as shown in screen (3), a new input prompt is added at the bottom of the screen as shown in screen (4) after the ENTER command is entered.

Figure 3C:
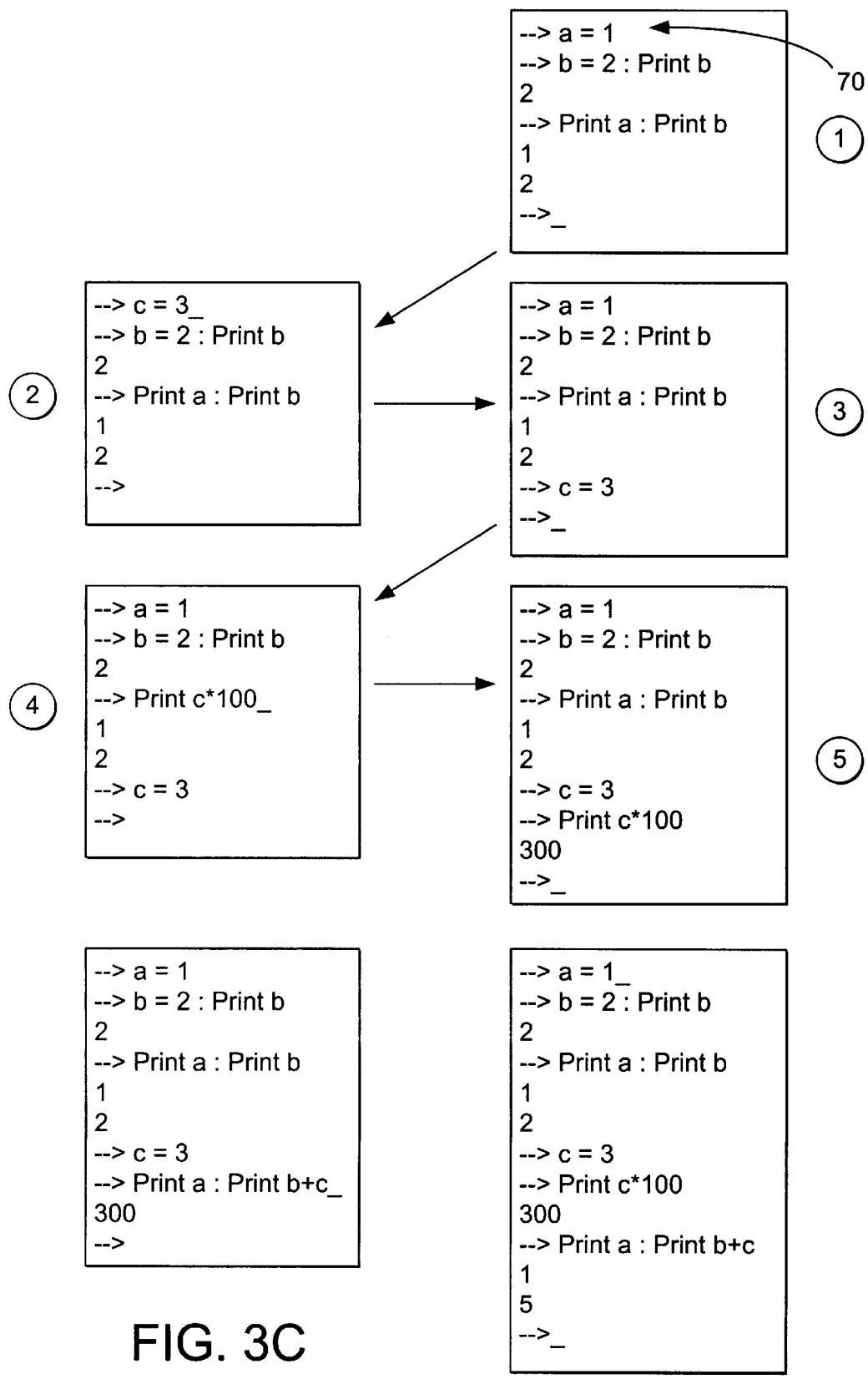

FIG. 3C represents the computer 10 responding to a "CTL-ENTER" keyword command where there is no marked block of input. The "CTL-ENTER" key transmits the current line to the external program 28, echoes this line to the bottom of the editor 26 file, and adds output 72 from the external program 28 at the bottom of the editor 26 file immediately following the corresponding echoed lines 76. This command transmits only input lines 74. Between screen (3) and screen (4), the fourth line of input was changed from "Print a:Print b" to "Print c*100", after which the CTL-ENTER command acts on the new input to the external program 28 as shown in screen (5).

Figure 3D:
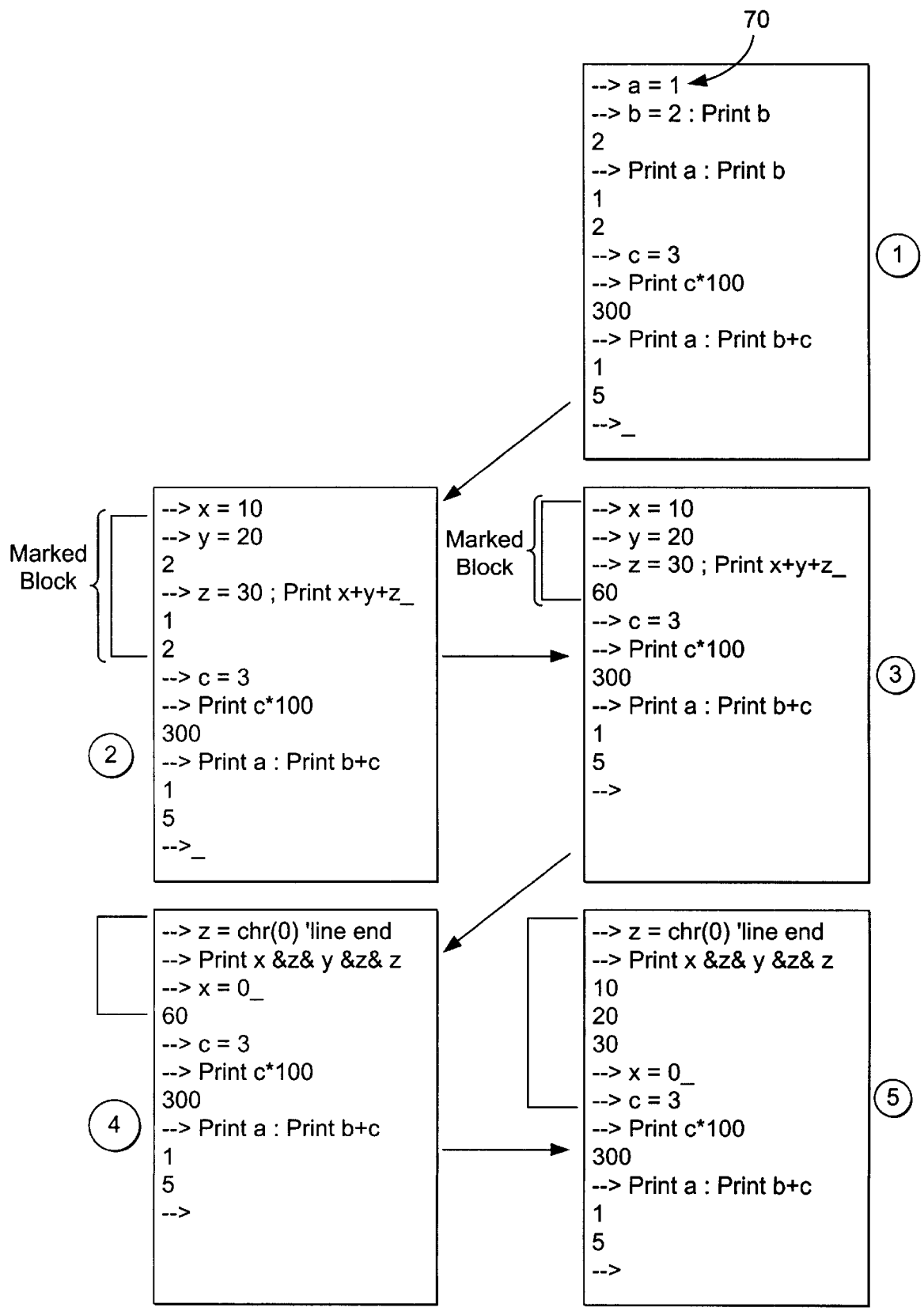

FIG. 3D represents the computer 10 responding to an ENTER keyword command where there is a marked block of text in the input to the external program 28. In screen (2), the first five lines are marked by the editor 26 line-blocking facility. The change between screen (2) and screen (3) shows the effect of the ENTER command on the marked block input. Although the cursor is shown on line 4 in screen (2), the cursor can appear on any line within the marked block. When a user replaces previously input lines as in screen (4), the resulting outputs replace the corresponding old outputs by interleaving the outputs as shown in screen (5). The line blocking remains until the user explicitly unblocks the input using the editor 26 line blocking facility.

Figure 3E:
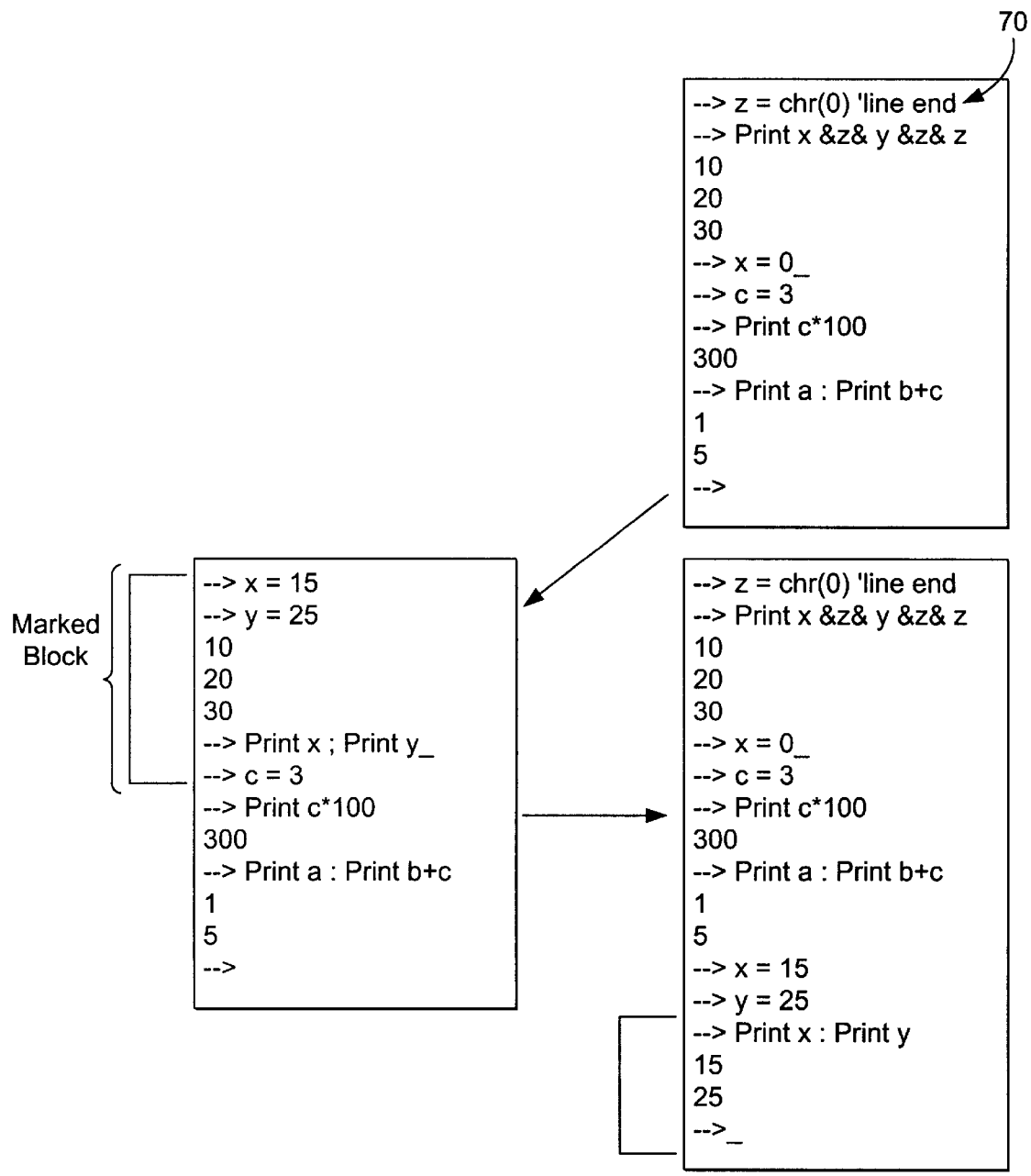

FIG. 3E represents the computer 10 responding to a CTL-ENTER keyword command where there is a marked block of input. From screen (1) to screen (2), the user changed some input lines and marked a block containing them. Screen (3) shows the result of a CTL-ENTER command, with the marked block moved to the bottom with the corresponding output to the marked input, where there is output to be displayed.

Figure 3F:
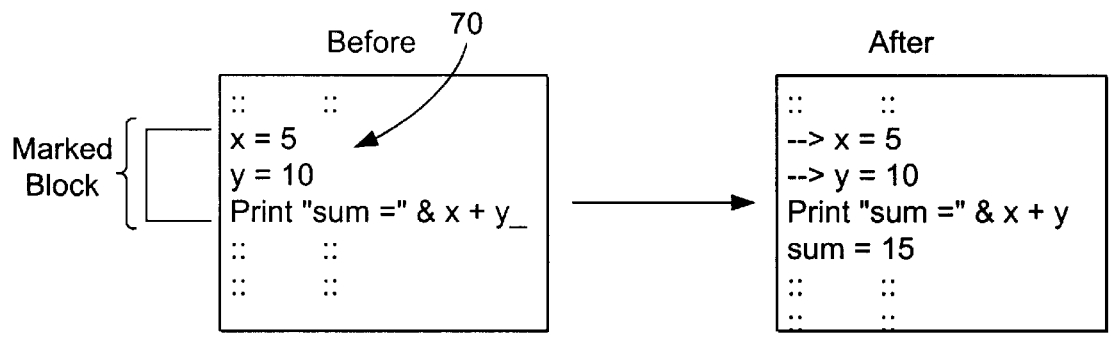

FIG. 3F represents the computer 10 responding to a "PAD-ENTER" keyword command. The "PAD-ENTER" key transmits the currently highlighted data 70 to the external program 28, and interleaves output 72 from the external program 28 with the selected lines. This command transmits all of the lines 74.

Figure 3G:
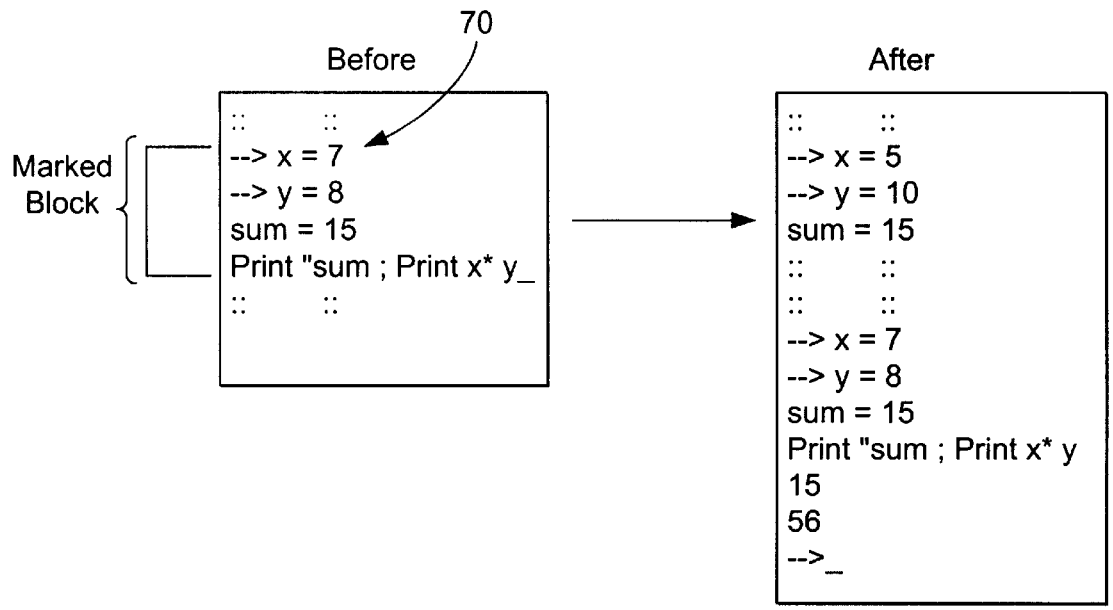

FIG. 3G represents the computer 10 responding to a "CTL-PAD-ENTER" keyword command. The "CTL-PAD-ENTER" key transmits the highlighted data 70 to the external program 28, echoes the currently selected line block to the bottom of the editor 26 file, and interleaves output 72 from the external program 28 with the echoed lines 76. This command transmits all of the lines 74.

Figure 3H:
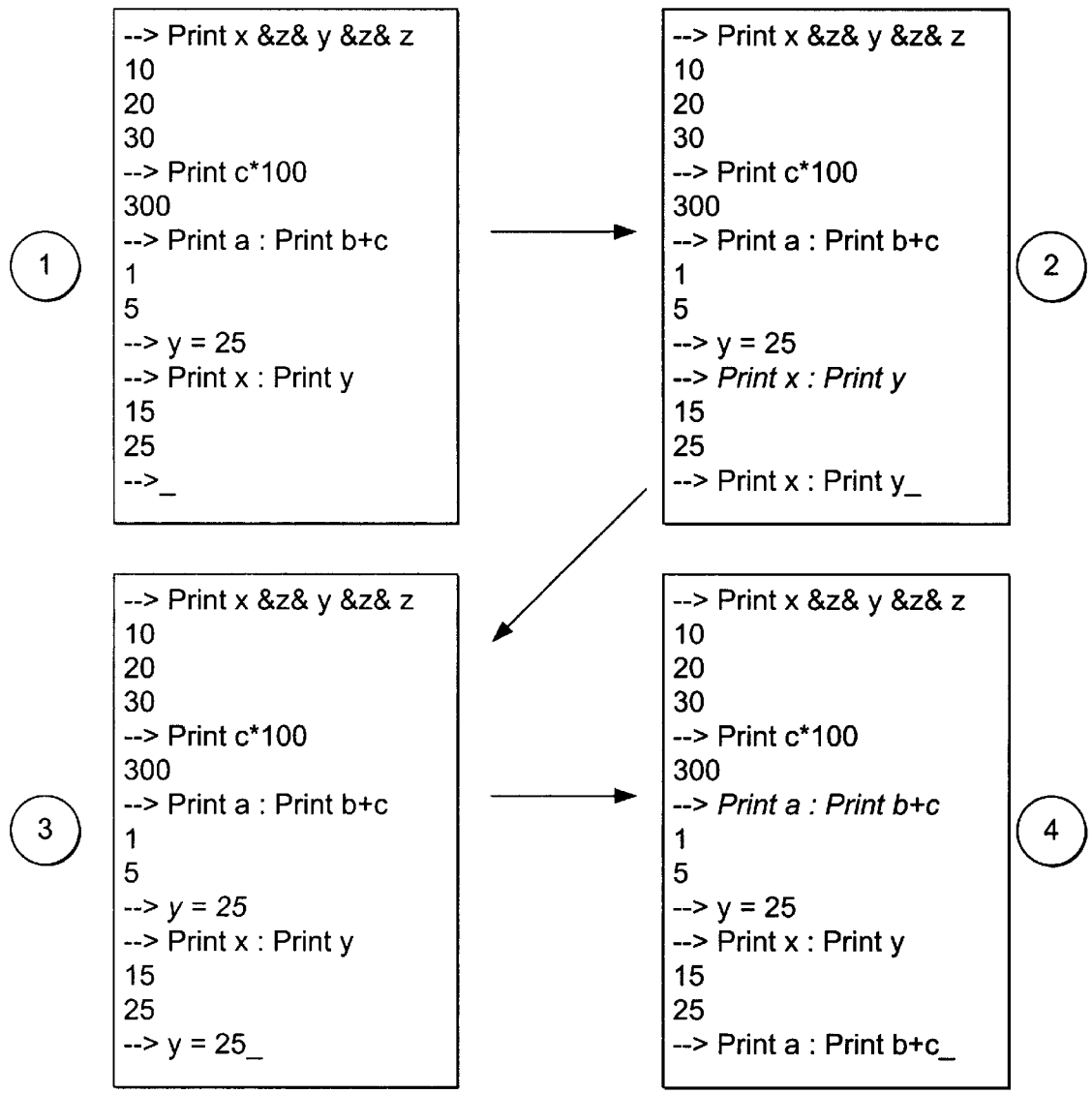

FIG. 3H represents the computer 10 responding to a "CTL-UP" command. The CTL-UP key emphasizes the previous input line 74 (shown as bold and italicized text in screens (2–4)), and echoes the line to the bottom of the editor 26 file. In essence, this command moves the input focus or cursor 78 up one line in the editor 26 file, and echoes the line at the bottom of the editor 26 file. The echoed line at the bottom of the screen may be evaluated as is, or it may be changed and evaluated by using the ENTER or CTL-ENTER key.

Figure 3I:
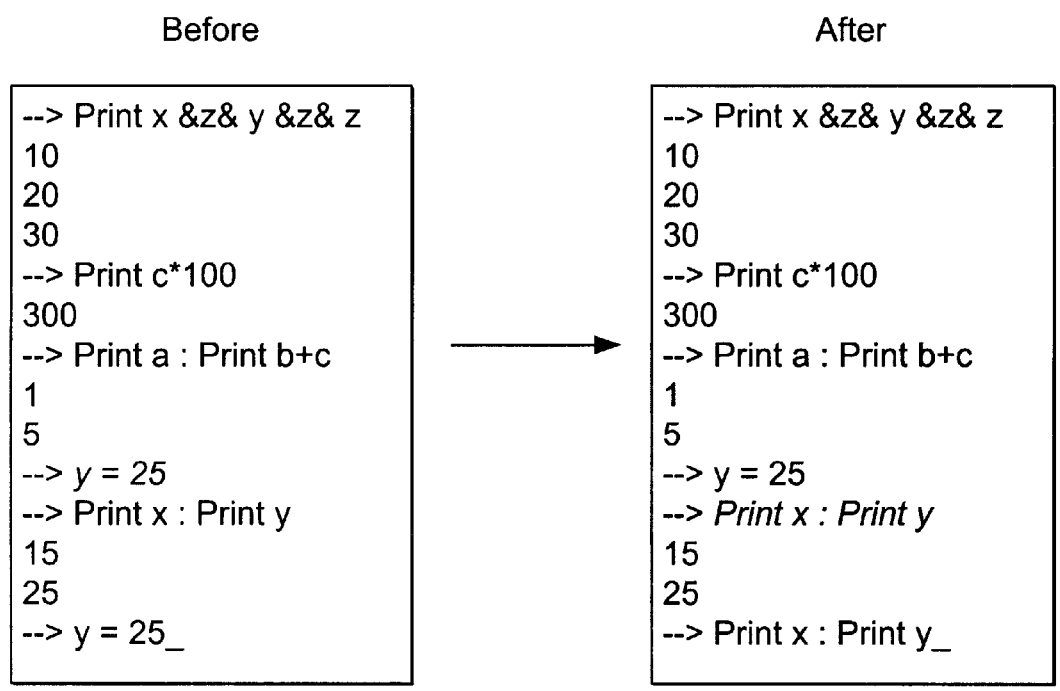

FIG. 3I represents the computer 10 responding to a "CTL-DOWN" command. The CTL-DOWN key combination emphasizes the next input line 74 and echoes the line to the bottom of the editor 26 file. In essence, this command moves the input focus or cursor 78 down one line in the editor 26 file, and echoes the line at the bottom of the editor 26 file.

What is claimed is:

1. A computerized apparatus for interacting with an external program from within another program executed by a computer, comprising:
    a computer;
    an editor shell, executed by the computer, that communicates bidirectionally with an interpreter external to the editor shell, wherein the editor shell passes input lines to the interpreter, the interpreter evaluates the input lines, the interpreter performs one or more functions indicated by the input lines, the interpreter generates a response comprising zero or mote output lines, and the interpreter passes the output lines back to the editor shell for subsequent display;
    wherein the editor shell performs an "Evaluate Bloc" command that submits a selected line block displayed by the editor shell to the interpreter for evaluation and inserts the output lines received from the interpreter immediately following the selected line block displayed by the editor shell, wherein the editor shell echoes the selected line block interleaved with the output lines received from the interpreter, and wherein all lines in the selected line block, and not just input lines, are submitted to the interpreter.

2. The computerized apparatus of clam 1, wherein the input lines are preceded with a prompt.

3. The computerized apparatus of claim 1, wherein the input lines are lines from a previously identified file.

4. The computerized apparatus of claim 1, wherein the input lines are arguments of a macro.

5. A computerized apparatus for interacting with an external program from within another program executed by a computer, comprising:
    a computer;
    an editor shell, executed by the computer, that communicates bidirectionally with an interpreter external to the editor shell wherein the editor shell passes input les to the interpreter, the interpreter evaluates the input lines, the interpreter performs one or more functions indicated by the input lines, the interpreter generates a response comprising zero or more output lines, and the interpreter passes the output lines back to the editor shell for subsequent display;
    wherein the editor shell performs a "Set Retrieve" command that submits a selected line block displayed by the editor shell to the interpreter and inserts the output lines received from the interpreter at an end of a file displayed by the editor shell, when the editor shell echoes the selected line block interleaved with the output lines received from the interpreter at the end of the file, and wherein all lines in the selected line block, and not just input lines, we submitted to the interpreter.

6. The computerized apparatus of claim 5, wherein the input lines and the output lines received from the interpreter are directed to a pre-assigned alternate window.

7. The computed apparatus of claim 5, wherein the input lines are echoed to the end of the file displayed by the editor shell, and the output lines received from the interpreter are added to the end of the file immediately following the echoed input les.

8. The computerized apparatus of claim 5, wherein the input lines are echoed to the end of the file displayed by the editor shell and the output lines received from the interpreter are added to the end of the file immediately interleaved with the echoed input lines.

9. A computer-implemented method for interacting with an external program from within another program executed by a computer, comprising:
    communicating bidirectionally between an editor shell executed by a computer and an interpreter external to the editor shell, comprising passing input lines from the editor shell to the interpreter, evaluating the input lines in the interpreter, perform one or more functions indicated by the input lines in the interpreter, generating a response comprising zero or more output lines in the interpreter, and passing the output lines from the interpreter back to the editor shell for subsequent display;
    performing an "Evaluate Block" command that submits a selected line block displayed by the editor shell to the interpreter fox evaluation and inserts the output lines received from the interpreter immediately following the selected line block displayed by the editor shell, wherein the editor shell echoes the selected line block interleaved with the output lines received from the interpreter, and wherein all lines in the selected line block, and not just input lines, are submitted to the interpreter.

10. The computer-implemented method of claim 9, wherein the input lines are preceded with a prompt.

11. The computer-implemented method of claim 9, wherein the input lines are lines from a previously identified file.

12. The computer-implemented method of claim 9, wherein the input lines are arguments of a macro.

13. A computer-implemented method for interacting with an external program from within another program executed by a computer, comprising:
    communicating bidirectionally between an editor shell executed by a computer and an interpret external to the editor shell, comprising passing input lies from the editor shell to the interpreter, evaluating the input lines in the interpreter, performing one or more functions indicated by the input lines in the interpreter, generating a response comprising zero or more output lines in the interpreter, and passing the output lines from the interpreter back to the editor shell for subsequent display;

performing a "Set Retrieve" command that submits a sleeted line block displayed by the editor shell to the interpreter and inserts the output lines received from the interpreter at an end of a file displayed by the editor shell wherein the editor shell echoes the selected line block interleaved with the output lines received from the interpreter at the end of the file, and wherein all lines in the selected line block, and not just input lines, are submitted to the interpreter.

14. The computer-implemented method of claim 13, wherein the input lines and the output lines received from the interpreter are directed to a pre-assigned alternate window.

15. The computer-implemented method of claim 13, wherein the input lines are echoed to the end of the file displayed by the editor shell, and the output lines received from the interpreter are added to the end of the file immediately following the echoed input lines.

16. The computer-implemented method of claim 13, where the input lines are echoed to the end of the file displayed by the editor shell, and the output les received from the interpreter are added to the end of the file immediately interleaved with the echoed input lines.

17. An article of manufacture comprising a program storage medium readable by a computer having a memory, the medium tangibly embodying one or more programs of instructions executable by the computer, to perform method steps for interacting with an external program from within another program executed by a computer, comprising:

communicating bidirectionally between an editor shell executed by a computer and an interpreter external to the editor shell, comprising passing input lines from the editor shell to the interpreter, evaluating the input lines in the interpreter, performing one or more functions indicated by the input lines in the interpreter, generating a response comprising zero or more output lines in the interpreter, and passing the output lines from the interpreter back to the editor shell for subsequent display;

performing an "Evaluate Block" command that submits a selected line block displayed by the editor shell to the interpreter for evaluation and inserts the output lines received from the interpreter immediately following the selected line block displayed by the editor shell, wherein the editor shell echoes the selected line block interleaved with the output lines received from the interpreter, and wherein all lines in the selected line block, and not just input lines, are submitted to the interpreter.

18. The article of manufacture of claim 17, wherein the input lines are preceded with a prompt.

19. The article of manufacture of claim 17, wherein the input lines are lines from a previously identified file.

20. The article of manufacture of claim 17, wherein the input lines are arguments of a macro.

21. An article of manufacture comprising a program storage medium readable by a computer having a memory, the medium tangibly embodying one or more programs of instructions executable by the computer to perform method steps for interacting with an external program from within another program executed by a computer, comprising:

communicating bidirectionally between an editor shell executed by a computer and an interpreter external to the editor shell, comprising passing input lines from the editor shell to the interpreter, evaluating the input lines in the interpreter, performing one or more functions indicated by the input lines in the interpreter, generating a response comprising zero or more output lines in the interpreter, and passing the output lines from the interpreter back to the editor shell for subsequent display;

performing a "Set Retrieve" command that submits a selected line block displayed by the editor shell to the interpreter and inserts the output lines received from the interpreter at an end of a file displayed by the editor shell, where the editor shell echoes the selected lines block interleaved with the output lines received from the interpreter at the end of the file, and wherein al lines in the selected line block and nor just input lines, are submitted to the interpreter.

22. The article of manufacture of claim 21, wherein the input lies and the output lines received from the interpreter are directed to a pre-assigned alternate window.

23. The article of manufacture of claim 21, wherein the input lines are echoed to the end of the file displayed by the editor shell and the output lines received from the interpreter are added to the end of the file immediately following the echoed input lines.

24. The article of manufacture of claim 21, wherein the input lines are echoed to the end of the file displayed by the editor shell, and the output lines received from the interpreter are added to the end of the file immediately interleaved with the echoed input lines.

* * * * *

UNITED STATES PATENT AND TRADEMARK OFFICE
CERTIFICATE OF CORRECTION

PATENT NO.     : 6,526,453 B2                                              Page 1 of 1
DATED          : February 25, 2003
INVENTOR(S)    : Michael Morris Golding It is certified that error appears in the above-identified patent and that said Letters Patent is hereby corrected as shown below:

Column 7,
Line 46, "mote" should read -- more --
Line 49, "Bloc" should read -- Block --

Column 8,
Lines 4 and 27, "les" should read -- lines --
Line 14, "when" should read -- wherein --
Line 19, "we" should read -- are --
Line 47, "fox" should read -- for --

Column 9,
Line 10, "sleeted" should read -- selected --
Line 13, after the first occurrence of "shell" insert -- , -- (comma)
Line 29, "les" should read -- lines --

Signed and Sealed this

Twenty-sixth Day of August, 2003

JAMES E. ROGAN
*Director of the United States Patent and Trademark Office*